United States Patent [19]

Frizzell et al.

[11] Patent Number: 4,738,723

[45] Date of Patent: Apr. 19, 1988

[54] ASBESTOS-FREE ASPHALT COMPOSITION

[75] Inventors: Chris Frizzell, Webster; William L. Adams, Pasadena; Robert Fulton, Friendswood, all of Tex.

[73] Assignee: Gulf States Asphalt Co., Houston, Tex.

[21] Appl. No.: 738,893

[22] Filed: May 29, 1985

Related U.S. Application Data

[63] Continuation of Ser. No. 334,260, Dec. 24, 1981, abandoned.

[51] Int. Cl.4 .................... C08L 1/00; C08L 95/00
[52] U.S. Cl. .................... 106/202; 106/281 R; 524/13; 524/59; 524/60; 524/69
[58] Field of Search .............. 106/202; 428/281, 143, 428/141; 524/13, 59, 60, 69

[56] References Cited

U.S. PATENT DOCUMENTS

| | | | |
|---|---|---|---|
| 2,806,825 | 9/1985 | Wentland | 106/202 |
| 3,276,906 | 10/1966 | Nielson | 428/281 |
| 4,468,430 | 8/1984 | Ruede | 428/143 |

FOREIGN PATENT DOCUMENTS

| | | | |
|---|---|---|---|
| 905029 | 7/1972 | Canada . | |
| 2033770 | 5/1970 | France . | |
| 85851 | 5/1982 | Japan | 106/202 |

*Primary Examiner*—Theodore Morris
*Attorney, Agent, or Firm*—Pravel, Gambrell, Hewitt, Kimball & Krieger

[57] ABSTRACT

Disclosed is a new and improved sealant and cement asphalt composition that is asbestos-free. The asbestos-free asphalt composition comprises about 40 to about 70 weight percent asphalt, about 5 to about 40 weight percent mineral filler, about 2 to about 10 weight percent cellulose fibers and about 2 to about 20 weight percent of a water-containing material such as an acrylic latex emulsion, asphalt emulsion or aqueous surfactant solution.

26 Claims, No Drawings

ASBESTOS-FREE ASPHALT COMPOSITION

This is a continuation of co-pending application Ser. No. 334,260 filed on Dec. 24, 1981 now abandoned.

TECHNICAL FIELD

This invention relates to asphalt compositions used for sealant and cement purposes.

PRIOR ART

Asphalt compositions are employed for a multitude of uses. Until recently, asbestos fibers have been universally used to provide structural and physical characteristics for asphalt compositions. But recent studies indicating the carcinogenic nature of asbestos fibers have created concern as to the safety of using asbestos in such compositions, both in manufacturing and in the end use of the products.

Thus, efforts have been made in the past to replace asbestos fibers in asphalt compositions with materials which do not pose the same carcinogenic health hazards of asbestos but which would still provide materials having the same characteristics for construction, sealant and cement uses.

U.S. Pat. Nos. 4,094,697; 4,168,178 and 4,168,179 disclose one attempted solution at an asbestos-free asphalt composition. All three references substitute substantial percentages of high-structure carbon black as a substitute for the asbestos fibers normally found in asphalt compositions. The Hesseler references additionally add a quantity of synthetic glass fibers. The Hesseler references indicate that other substitutes have been tried but U.S. Pat. No. 4,168,178 states that replacement of asbestos by fibers other than synthetic glass fibers has not proven satisfactory.

The use of synthetic glass fibers in sealants and cements has been disclosed in U.S. Pat. Nos. 4,052,219 and 4,166,752. U.S. Pat. Nos. 2,750,295 and 2,861,895 disclose the use of cellulose fibers for paving compositions of substantially different properties and proportions of ingredients than the presently claimed invention.

SUMMARY OF THE INVENTION

A new and improved sealant and cement composition is disclosed that is entirely free of carcinogenic asbestos fibers. The asbestos-free asphalt composition comprises about 40 to about 70 weight percent asphalt, about 5 to about 40 weight percent mineral filler, about 2 to about 10 weight percent cellulose fibers and about 2 to about 20 weight percent of a water-containing material such as an acrylic latex emulsion, asphalt emulsion or aqueous surfactant solution.

DETAILED DESCRIPTION

It has been discovered that the addition of small amounts of water containing a surfactant greatly improves the dispersion of the cellulose fiber without agglomeration and produces a very satisfactory, smooth product alike in appearance and performance to a similar product containing asbestos.

To achieve the asbestos-free asphalt composition of the invention, the asphalt is preferably admixed into the composition without other modifying ingredients. Alternatively, the asphalt may be added in the form of an asphalt cutback or asphalt emulsion. Preferably, the asphalt itself will comprise about 40 to about 55 weight percent of the total composition, but may be as much as 70 weight percent of the total mixture. The remainder of the composition is comprised of about 5 to about 40 weight percent mineral filler, about 2 to about 10 weight percent cellulose fibers and about 2 to about 20 weight percent of a water-containing material defined below.

Asphalt cutbacks consisting of about 50 to about 75 weight percent asphalt and about 25 to about 50 weight percent solvent also provide compositions of satisfactory properties. The solvents employed in making up the asphalt cutbacks may be any of those used for that purpose by those of ordinary skill in the art. Mineral spirits, a fraction of aliphatic hydrocarbons, which commonly boil between 250° F. and 400° F., is the preferred solvent for these asphalt cutbacks. Other solvents may be used, and the proportion of solvents to asphalt may be varied according to the properties desired in the final product. Particularly preferred are asphalt cutbacks meeting the American Society for Testing and Materials (ASTM) D 2028 specification for rapid-curing type liquid asphalt.

The asphalt may also be present in the asbestos-free composition in the form of an asphalt emulsion, a suspension of finely divided oil droplets in water having a large interfacial surface tension between the oil and water. Those asphalt emulsions meeting the ASTM D 2397 specification for emulsified asphalt are preferred.

In this invention, mineral aggregates and fillers comprise about 5 to about 40 weight percent of the total composition. Kaoline clay and calcium carbonate are the preferred fillers in the preferred range of about 15 to about 30 weight percent of the total composition. Bentonite clay and sander's dust are two other alternative mineral fillers that can be employed. Cellulose fibers providing about 2 to 10 weight percent, preferably about 4 to about 7 weight percent of the asphalt composition, furnish structure to the asbestos-free composition and aid in preventing component separation, particularly when asphalt cutbacks are employed.

A water-containing material such as an acrylic latex emulsion, asphalt emulsion or aqueous surfactant solution is added to the composition to aid in dispersing the cellulose fibers throughout the composition, preventing clumping and separation. It has been found that a nonuniform asphalt product results in the absence of such water-containing substances. The addition of the water-containing material in the range of about 2 to about 20 weight percent of the composition produces satisfactory sealing characteristics and product uniformity.

The acrylic latex emulsions add elasticity to the asphalt composition in addition to dispersing the cellulose fibers. Several acrylic latex emulsions which have been tested and found to produce superior asphalt sealants and cements in accordance with the invention are the acrylics sold under the trademark "Rhoplex AC-64" by Rohm and Haas Co., the acrylic latex and elastomers sold under the trademarks "Hycar 1551" and "Hycar 1552" by B. F. Goodrich Chemical Group and the styrene-butadiene copolymer sold under the trademark "Pliolite" by Goodyear Tire and Rubber Co. The latexes preferably comprise about 8 to about 20 weight percent of the asphalt composition. These latex emulsions contain a large percentage of water. For instance, the styrene-butadiene emulsion sold under the Goodyear "Pliolite" trademark is 31 percent water.

Aqueous surfactant solutions may also be added to the composition to disperse the fibers and prevent clumping and component separation. It is preferred that the surfactant solution be added in the range of about 2 to about 5 percent of the total asphalt composition, the chemical surfactant preferably comprising about 0.2 to about 0.5 weight percent of the asphalt composition, or about 8 to about 12 percent of the surfactant solution. The surfactants determined to be effective are those sold under the trademarks "Vinsol 3015" by Hercules Inc. and "Indulin SA-L" by Westvaco Corp.

An alternate embodiment of the invention employing presoaked cellulose fibers yielded a sealant and cement having satisfactory properties. The soaking of cellulose fibers in water or a surfactant solution prior to the addition of the cellulose fibers to the composition increased product uniformity.

The following examples will further illustrate the preparation of the asbestos-free asphalt composition according to the present invention. They are given by way of illustration and not as limitations on the scope of the invention. Thus, it should be understood that reactants, proportions of reactants, and time and temperature of the reaction steps may be varied with much the same results achieved.

Most of the below examples were tested according to the ASTM D-2822 standard specification for asphalt roof cement. Those samples tested passed the sample uniformity and workability tests as well as the temperature behavior test. The first of these measures is the behavior of the cement after being spread upon a steel panel and exposed for one hour at about 23° C. and then baked for five hours in an oven at 60° C. The cement should show no evidence of blistering. Sag or slide of the cement from an original reference line should be no greater than 6 millimeters. Following the oven test, the panels are then cooled to room temperature and immersed in a water bath at 0° C. for one hour. After removal from the water bath, the panels are immediately bent over a mandrel through 180° and thoroughly examined for cracking or separation of the cement from the metal.

TABLE 1

|  | Wt. % | | |
| --- | --- | --- | --- |
|  | Example 1 | Example 2 | Example 3 |
| Asphalt Cutback | 68.71 | 75.17 |  |
| RC-2 Cutback |  |  | 57.52 |
| Solvent |  |  | 19.61 |
| Calcium Carbonate | 10.34 | 11.31 | 9.80 |
| Cellulose Fibers | 3.77 | 4.12 | 3.23 |
| "Rhoplex AC-64" | 17.18 |  |  |
| "Hycar 1552" |  | 9.40 |  |
| "Pliolite" |  |  | 9.80 |

A rubberized asphalt cement was prepared according to the above Table 1 for Examples 1–3. The asbestos-free asphalt compositions of Examples 1–3 were all made by first adding the acrylic latex emulsions to the asphalt cutback, followed by the addition of the cellulose fibers and the calcium carbonate.

The asphalt cutback consisted of approximately 66% 220/230 of softening point asphalt and 34% mineral spirits solvent. The RC-2 cutback was approximately 79% asphalt and 21% mineral spirits. The calcium carbonate employed was that sold under the trademark "Micro Fill" by Calcium Carbonate Co. The cellulose fibers were a mixture of fibers having about 15 to 20 percent of the fibers between 0.5 and 1.5 millimeters in length, 40% between 1.5 and 2.5 millimeters and 25 to 30% longer than 2.5 millimeters.

The viscosity of the three compositions were measured with a Brookfield viscometer H.A.F., with a number 6 spindle at 5 rpm and are reported in Table 2 below. All three compositions passed the ASTM test for asphalt roof cement at 60° C. and 0° C. As noted below in Table 2, some very slight cracking was noticed in the compositions of Examples 1 and 2 but it did not extend through to the steel panels and was not of sufficient scale to fail the ASTM tests.

TABLE 2

|  | Example 1 | Example 2 | Example 3 |
| --- | --- | --- | --- |
| Brookfield Viscosity ASTM D-2822 Tests | 680,000 cs. | 336,000 | 212,000 |
| Behavior at 60° C. | No Sag | 4.5 mm | 6 mm |
| Pliability at 0° C. | Very slight cracking | Very slight cracking | No cracking |

EXAMPLE 4

|  | Wt. % |
| --- | --- |
| RC-2 Cutback | 69.50% |
| "Vinsol 3015" | 0.22% |
| Water | 2.28% |
| Calcium Carbonate | 22.50% |
| Cellulose Fibers | 5.50% |

The composition of Example 4 prepared as listed above with an anionic surfactant solution comprising 2.5 weight percent of the total composition was made with cellulose fibers having a shorter fiber length than those of Examples 1–3. There was no cutback separation on steel panels placed in a vertical position even in full sunlight. The composition was tested according to ASTM D-2822 and passed the performance tests.

EXAMPLE 5

|  | Wt. % |
| --- | --- |
| Quick Dry Paint | 68.96% |
| CRS-2 Asphalt Emulsion | 12.16% |
| Calcium Carbonate | 14.15% |
| Cellulose Fibers | 4.73% |

Brookfield viscosity of the above composition at 25° C. was 180,000 centipoises. The blend had a smooth uniform appearance and was easily troweled. There was no cutback separation or blistering evident during the ASTM tests, all of which were easily passed by the composition.

EXAMPLE 6

|  | Wt. % |
| --- | --- |
| RC-2 Cutback | 55.23% |
| CRS-2 Asphalt Emulsion | 18.41% |
| Calcium Carbonate | 22.72% |
| Cellulose Fibers | 3.64% |

The composition of Example 6 was smooth and uniform in appearance and passed the ASTM D-2822 physical performance tests.

EXAMPLE 7-8

TABLE 3

|  | Example 7 (wt. %) | Example 8 (wt. %) |
|---|---|---|
| Asphalt | 58.08 | 59.60 |
| Bentonite Clay | 30.98 | 30.88 |
| Cellulose Fibers | 7.04 | 5.90 |
| Water | 3.55 | 2.84 |
| "Vinsol 3015" | 0.35 | 0.28 |
| "Pliolite" |  | 0.50 |

Asbestos-free marine sealant compositions were prepared in Examples 7 and 8 with straight asphalt and not asphalt cutbacks. The asphalt employed had a softening point of 22°-29° C. and a Saybolt Furol viscosity of 160-240 at 100° C. A 10% aqueous surfactant solution comprising 3.9 weight percent and 3.12 weight percent of the total composition in Examples 7 and 8, respectively, was employed to aid in dispersal of the fibers. The softening point for each composition was 160° C. plus. The addition of the latex emulsion in Example 8 along with a reduction in the quantity of cellulose fibers and surfactant solution substantially increased ductility of the composition from the 15.21 centimeters of Example 7 to 34.06 centimeters of Example 8.

EXAMPLE 9

|  | Wt. % |
|---|---|
| Asphalt | 52.80% |
| Bentonite Clay | 28.17% |
| Cellulose Fibers with Water | 19.02% |

The cellulose fibers were soaked overnight in water and added to the asbestos-free composition. The presoaked cellulose fibers dispersed very easily in the asphalt-bentonite clay composition. It was discovered that the 110 grams of cellulose fibers added had retained 216.9 grams of water.

It should be noted that the foregoing disclosure and description of the invention is illustrative and explanatory thereof, and various changes in the reactants, proportions of reactants, and time and temperature of the reaction steps may be varied without exceeding the scope and spirit of the invention.

We claim:

1. An asbestos-free asphalt composition, consisting essentially of:
   between about 40 and about 70 weight percent asphalt;
   between about 5 and about 40 weight percent mineral filler;
   between about 2 and about 10 weight percent cellulose fibers; and
   between about 2 and about 20 weight percent of a water-containing material selected from the group consisting of an acrylic latex emulsion, a styrene-butadiene copolymer, an asphalt emulsion and an aqueous surfactant solution.

2. The composition of claim 1, wherein the asphalt is present in the composition in the form of an asphalt cutback, said asphalt cutback comprising:
   between about 50 and about 85 weight percent asphalt; and
   between about 15 and about 50 weight percent solvent for said asphalt.

3. The composition of claim 1, wherein the mineral filler is Kaolin clay.

4. The composition of claim 1, wherein the mineral filler is calcium carbonate.

5. The composition of claim 1, wherein the water-containing material is an acrylic latex emulsion.

6. The composition of claim 5, wherein the acrylic latex emulsion comprises between about 5.0 and 20.0 weight percent of the composition.

7. The composition of claim 1, wherein the water-containing material is a styrene-butadiene copolymer.

8. The composition of claim 1, wherein the water-containing material is an asphalt emulsion.

9. The composition of claim 8, wherein the asphalt emulsion comprises between about 5.0 and about 20.0 weight percent of the composition.

10. The composition of claim 1, wherein the water-containing material is an aqueous surfactant solution.

11. The composition of claim 10, wherein the aqueous surfactant solution comprises between about 1.0 and about 7.0 weight percent of the composition and the surfactant comprises between about 0.1 and about 0.7 weight percent of the composition.

12. An asbestos-free asphalt composition, consisting essentially of:
    between about 40 and about 70 weight percent asphalt;
    between about 5 and about 40 weight percent mineral filler; and
    between about 10 and about 55 weight percent cellulose fibers which have been soaked in water prior to addition to the composition.

13. A process for preparing an asbestos-free asphalt composition, consisting essentially of:
    soaking cellulose fibers in an aqueous environment prior to the making of the asphalt composition;
    mixing between about 40 and about 70 weight percent asphalt with about 5 to about 40 weight percent mineral filler; and
    mixing into the asphalt and mineral filler mixture about 10 to about 55 weight percent cellulose fibers that had been previously soaked in an aqueous environment, said weight percent figures based upon the weight of the total asphalt composition.

14. An asphalt composition which is free of asbestos and highly structured carbon black, comprising:
    between about 40 and about 70 weight percent asphalt;
    between about 5 and about 40 weight percent mineral filler;
    between about 2 and about 10 weight percent cellulose fibers; and
    between about 2 and about 20 weight percent of a water-containing material selected from the group consisting of an acrylic latex emulsion, a styrene-butadiene copolymer, an asphalt emulsion and an aqueous surfactant solution.

15. The composition of claim 14, wherein the asphalt is present in the composition in the form of an asphalt cutback, said asphalt cutback comprising:
    between about 50 and about 85 weight percent asphalt; and
    between about 15 and about 50 weight percent solvent for said asphalt.

16. The composition of claim 14, wherein the mineral filler is Kaolin clay.

17. The composition of claim 14, wherein the mineral filler is calcium carbonate.

18. The composition of claim 14, wherein the water-containing material is an acrylic latex emulsion.

19. The composition of claim 18, wherein the acrylic latex emulsion comprises between about 5.0 and 20.0 weight percent of the composition.

20. The composition of claim 14, wherein the water-containing material is a styrene-butadiene copolymer.

21. The composition of claim 14, wherein the water-containing material is an asphalt emulsion.

22. The composition of claim 21, wherein the asphalt emulsion comprises between about 5.0 and about 20.0 weight percent of the composition.

23. The composition of claim 14, wherein the water-containing material is an aqueous surfactant solution.

24. The composition of claim 23, wherein the aqueous surfactant solution comprises between about 1.0 and about 7.0 weight percent of the composition and the surfactant comprises between about 0.1 and about 0.7 weight percent of the composition.

25. An asphalt composition which is free of asbestos and highly structured carbon black, comprising:

between about 40 and about 70 weight percent asphalt;

between about 5 and about 40 weight percent mineral filler; and between about 10 and about 55 weight percent cellulose fibers which have been soaked in water prior to addition to the composition.

26. A process for preparing an asphalt composition which is free of asbestos and highly structured carbon black, comprising:

soaking cellulose fibers in an aqueous environment prior to the making of the asphalt composition;

mixing between about 40 and about 70 weight percent asphalt with about 5 to about 40 weight percent mineral filler; and mixing into the asphalt and mineral filler mixture about 10 to about 55 weight percent cellulose fibers that had been previously soaked in an aqueous environment, said weight percent figures based upon the weight of the total asphalt composition.

* * * * *